US009430004B2

(12) United States Patent
Meadowcroft

(10) Patent No.: US 9,430,004 B2
(45) Date of Patent: Aug. 30, 2016

(54) PULL TAB WITH EXCHANGEABLE IDENTIFICATION MARKER FOR PLUGGABLE COMMUNICATIONS MODULES

(71) Applicant: David Meadowcroft, San Jose, CA (US)

(72) Inventor: David Meadowcroft, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 238 days.

(21) Appl. No.: 14/039,153

(22) Filed: Sep. 27, 2013

(65) Prior Publication Data
US 2015/0092327 A1 Apr. 2, 2015

(51) Int. Cl.
*G06F 1/18* (2006.01)

(52) U.S. Cl.
CPC ..................... *G06F 1/183* (2013.01)

(58) Field of Classification Search
CPC ............ G02B 6/00; G02B 6/36; G02B 6/42;
H01R 4/48; H01R 13/62; H01R 13/627;
H01R 13/648; H05K 5/00
USPC .......... 361/654, 752, 756, 796, 807, 679.01,
361/679.58, 724–728, 732, 747, 754–755,
361/759, 798, 801, 816, 818, 831; 385/52,
385/56, 76–79, 88–94, 134, 53, 59, 85–86,
385/139; 439/92, 152–153, 157, 160, 345,
439/347, 352–353, 537, 607, 923, 939, 188,
439/567, 607.1, 607.01, 607.18, 610, 372,
439/483, 630, 256; 292/87, 89, 147,
292/152–153, 175, 197; 24/59, 272, 294,
24/366, 540; 16/110.1, 422, 429, 438
See application file for complete search history.

(56) References Cited

U.S. PATENT DOCUMENTS

| | | | | |
|---|---|---|---|---|
| 4,773,874 A * | 9/1988 | Kopeski, Jr. | ....... | H01R 13/6392 439/369 |
| 6,786,653 B1 * | 9/2004 | Hwang | ................ | H01R 13/633 385/92 |
| 6,884,097 B2 * | 4/2005 | Ice | ........................ | G02B 6/4201 361/728 |
| 7,241,153 B2 * | 7/2007 | He | ........................ | H01R 13/506 439/148 |
| 7,264,406 B1 * | 9/2007 | Yoshikawa | .......... | G02B 6/4201 385/88 |
| 7,322,845 B2 * | 1/2008 | Regnier | ............. | H01R 13/6335 439/352 |
| 7,351,090 B1 * | 4/2008 | Moore | ................ | G02B 6/4246 361/728 |

(Continued)

FOREIGN PATENT DOCUMENTS

EP 1522231 A1 * 4/2005 ........... A44B 19/306

OTHER PUBLICATIONS http://www.southernimperial.com/pub/2015Catpages/116.pdf.*

(Continued)

*Primary Examiner* — Zachary M Pape
*Assistant Examiner* — Amir Jalali

(57) ABSTRACT

A pull tab with exchangeable identification marker for pluggable communications modules is provided. In general, the pull tab includes an identification region that receives an exchangeable identification marker. The exchangeable identification marker is attached to the pull tab via at least one of compression, fastening, clipping, spring force, and retention features built into the pull tab. This attachment can be permanent, semi-permanent, removable, and combinations thereof. Moreover, the exchangeable identification marker can be attached to, and even removed from, the pull tab while the pluggable communications module is connected to other communications equipment.

19 Claims, 9 Drawing Sheets

(56) References Cited

U.S. PATENT DOCUMENTS

| | | | | |
|---|---|---|---|---|
| 7,416,433 B1* | 8/2008 | Wu | G02B 6/4246 439/160 |
| 7,473,124 B1* | 1/2009 | Briant | H01R 13/6275 439/352 |
| 7,566,246 B2* | 7/2009 | Moore | G02B 6/4201 439/607.01 |
| 7,625,135 B2* | 12/2009 | Dodds | G02B 6/3897 385/92 |
| 7,643,720 B2* | 1/2010 | Kim | H01R 13/639 385/134 |
| 7,666,023 B2* | 2/2010 | Wu | H01R 13/6275 439/352 |
| 7,793,449 B2* | 9/2010 | Groch | B42F 1/02 24/67 R |
| 8,155,519 B2* | 4/2012 | Sheth | H04B 10/801 370/465 |
| 8,292,518 B2 | 10/2012 | Togami et al. | |
| 8,475,197 B2 | 7/2013 | Zerebilov et al. | |
| 8,506,176 B2* | 8/2013 | Daikuhara | G02B 6/4284 385/14 |
| 8,537,558 B2* | 9/2013 | Su | H01R 9/032 361/740 |
| 8,556,646 B2* | 10/2013 | Kappla | G02B 6/4246 439/352 |
| 8,599,567 B2* | 12/2013 | Wu | G02B 6/4261 361/752 |
| 8,678,848 B2* | 3/2014 | Chan | H01R 43/20 439/159 |
| 2003/0156801 A1* | 8/2003 | Hwang | G02B 6/4292 385/92 |
| 2003/0171022 A1* | 9/2003 | Distad | G02B 6/4261 439/372 |
| 2003/0194190 A1* | 10/2003 | Huang | G02B 6/4292 385/92 |
| 2006/0215968 A1* | 9/2006 | Kayner | H01R 13/6275 385/89 |
| 2006/0274509 A1* | 12/2006 | Meadowcroft | G02B 6/4201 361/730 |
| 2007/0133930 A1* | 6/2007 | Ishikawa | G02B 6/4201 385/92 |
| 2007/0189673 A1* | 8/2007 | Yoshikawa | G02B 6/4201 385/53 |
| 2008/0280490 A1* | 11/2008 | Nguyen | G06F 12/1416 439/607.01 |
| 2011/0080008 A1* | 4/2011 | Teo | H01R 13/6272 292/197 |
| 2011/0081114 A1* | 4/2011 | Togami | G02B 6/4246 385/76 |
| 2011/0267742 A1* | 11/2011 | Togami | G02B 6/4246 361/679.01 |
| 2012/0275120 A1* | 11/2012 | Nguyen | G02B 6/4292 361/747 |
| 2012/0282807 A1* | 11/2012 | Regnier | H01R 13/6469 439/607.01 |
| 2012/0296174 A1* | 11/2012 | McCombie | A61B 5/02427 600/301 |
| 2013/0071072 A1* | 3/2013 | Xie | G02B 6/4277 385/92 |
| 2013/0279122 A1* | 10/2013 | Tang | H01R 13/6335 361/747 |
| 2013/0308912 A1* | 11/2013 | Avlonitis | G02B 6/423 385/88 |
| 2014/0104808 A1* | 4/2014 | Koutrokois | G02B 6/4246 361/818 |
| 2014/0126957 A1* | 5/2014 | Shi | G02B 6/4246 403/322.1 |
| 2014/0219616 A1* | 8/2014 | Ishii | G02B 6/4261 385/92 |
| 2014/0254993 A1* | 9/2014 | Koutrokois | G02B 6/4261 385/92 |
| 2015/0093083 A1* | 4/2015 | Tsai | G02B 6/4262 385/92 |
| 2015/0155963 A1* | 6/2015 | Tang | H04J 14/0205 398/83 |
| 2015/0263453 A1* | 9/2015 | Wang | H01R 13/6335 385/76 |
| 2015/0277070 A1* | 10/2015 | Luo | G02B 6/428 385/88 |
| 2015/0288097 A1* | 10/2015 | Yen | H01R 13/6275 439/352 |

OTHER PUBLICATIONS

Southern Imperial, Push Pins, Dec. 2, 2009, Southern Imperial.*
Americas Headquarters, Cisco Systems, Inc., (Oct. 3, 2012), "Cisco 40-Gigabit QSFP + Transceiver Modules Installation Note", San Jose, CA.

* cited by examiner

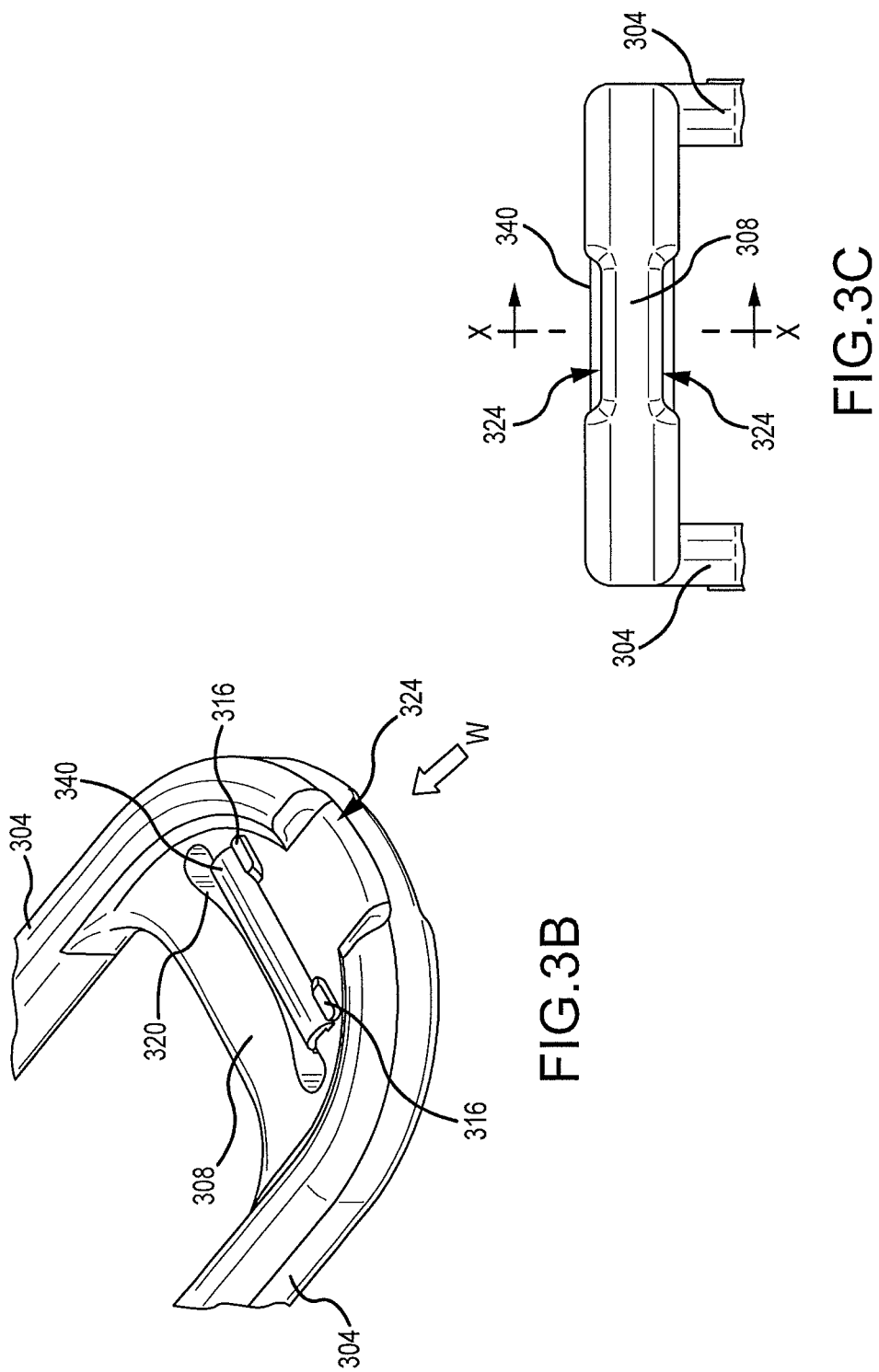

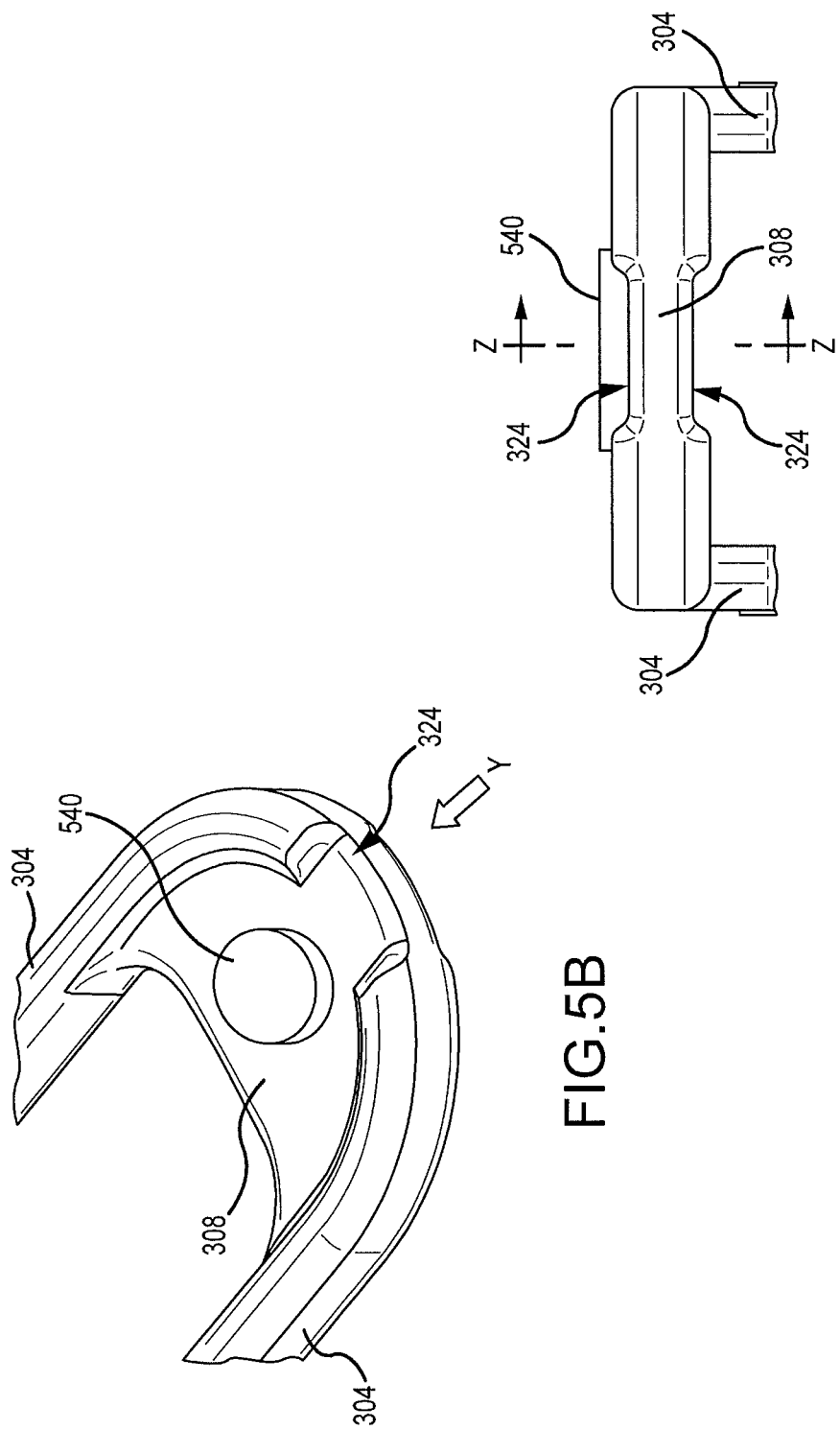

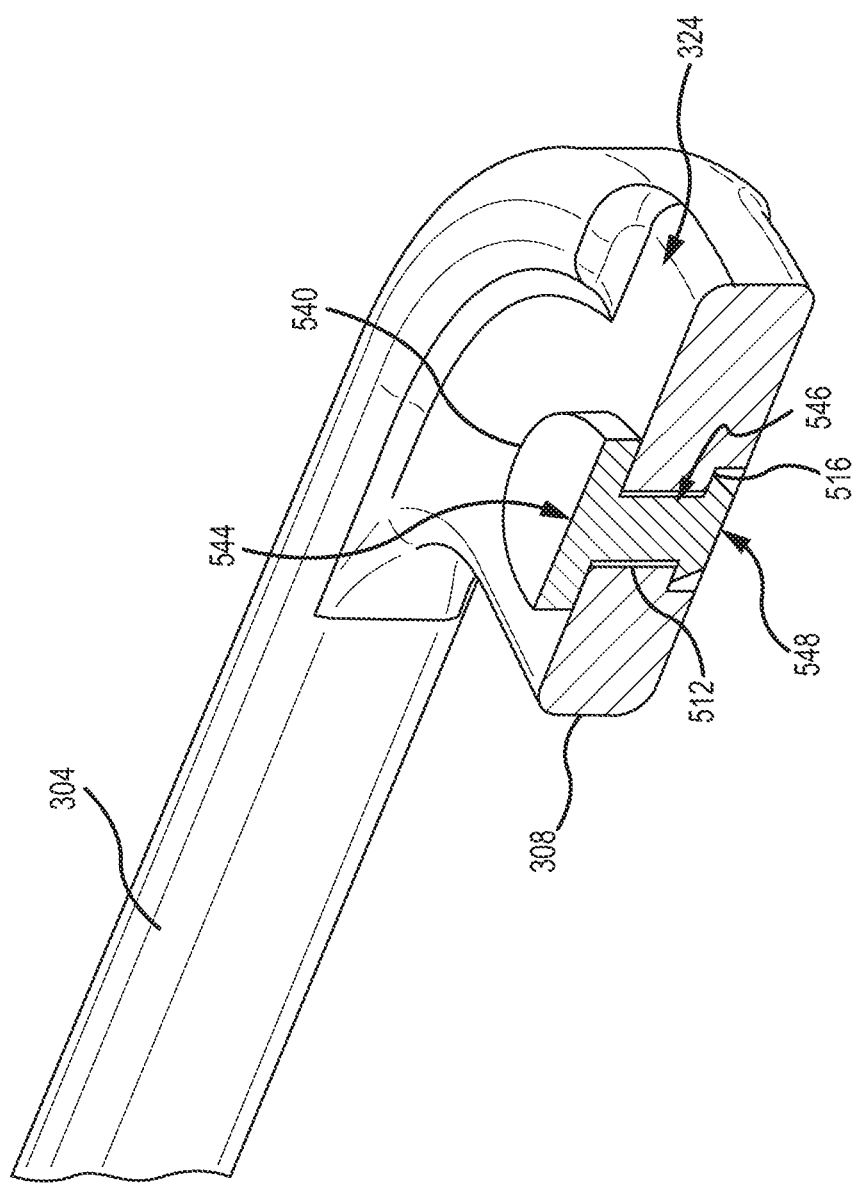

US 9,430,004 B2

PULL TAB WITH EXCHANGEABLE IDENTIFICATION MARKER FOR PLUGGABLE COMMUNICATIONS MODULES

BACKGROUND

Telecommunications equipment has continually evolved to provide expanded capabilities in the exchange of information between entities. Included in this evolution is the ability for telecommunications equipment to allow uninterrupted operations even during routine system maintenance, component failures, software updates, hardware upgrades, and the like. In part, the ability to maintain uninterrupted operations in a communications system can be attributed to a combination of software and hardware interface equipment.

Whether a telecommunications system incorporates redundant elements, adaptive software, reconfigurable components, or combinations thereof, the backbone of a telecommunications system is the hardware. At a base level, this hardware can include data transmission lines (e.g., fiber-optic cables, copper, twisted-pair cables, phone lines, etc.), routers, switches, and other network interface components. The ability for certain components to be removed and replaced, or swapped, without interrupting operations (e.g., shutting systems down, etc.) is known as hot swapping, or hot plugging.

BRIEF DESCRIPTION OF THE DRAWINGS

FIG. 3B is a partial perspective view of the first pull tab with an engaged identification marker in accordance with embodiments of the present disclosure;

FIG. 3C is an end view of the first pull tab taken from view arrow "W" of FIG. 3B;

FIG. 5B is a partial perspective view of the third pull tab with an engaged identification marker in accordance with embodiments of the present disclosure;

FIG. 5C is an end view of the third pull tab with an engaged identification marker taken from view arrow "Y" of FIG. 5B; and FIG. 5D is a partial perspective section view of the third pull tab taken from section "Z-Z" of FIG. 5C.

Figure 1:
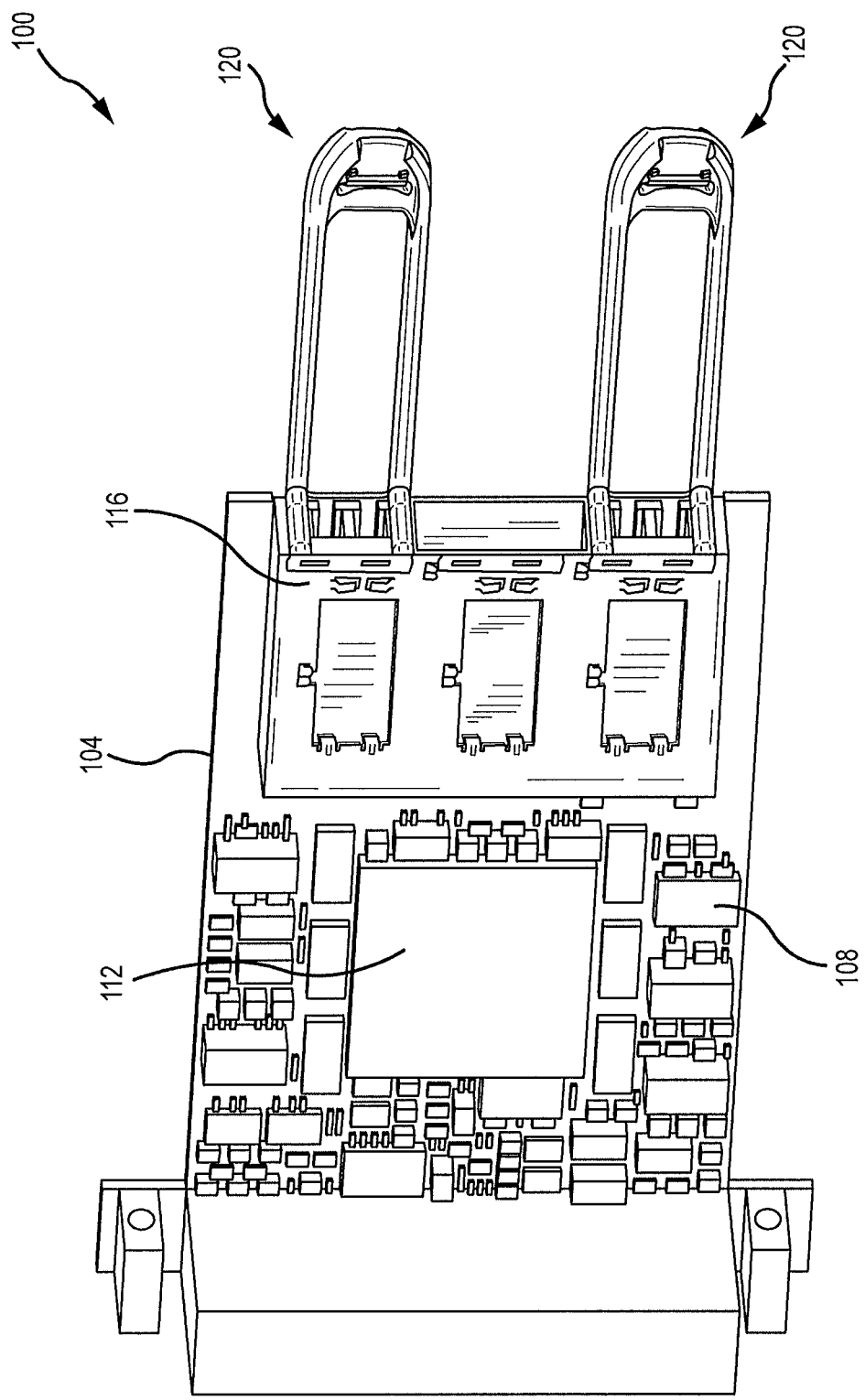
FIG. 1 is a perspective view of a communications system in accordance with embodiments of the present disclosure.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Small form-factor pluggable (SFP) transceiver modules are one type of hot swappable equipment. Among other things, various configurations of SFP transceivers are designed to interface network devices to communications transmission lines. In some cases, manufacturers include a bail clasp (also known as a bail latch) or a pull tab to enable insertion and extraction of a transceiver module. Typical pull tabs are constructed of metal or plastic and may include a color code used as an identifier.

Traditionally, pull tabs have been supplied in different colors to identify different types and/or capabilities of transceiver modules. However, supplying different colors of pull tabs for identification can cause a number of problems for a manufacturer as well as an end user. For instance, inventory management problems may be created when each type of module requires its own identification color pull tab. The procurement, inventory control, and management of multiple colored tabs can result in higher costs for manufacturers and end users. Moreover, where certain colored flexible plastics are used, the identification color can leech, or transfer, from the plastic itself. This color leeching may stain the hands of those who come into contact with the colored flexible plastic pull tab.

In addition, some modules may require testing, in situ, to determine a level of performance of the module. Varying levels of performance may correspond to different colors of identification pull tabs. After the testing is performed the module may have to be extracted from the interface equipment socket to attach a traditional colored pull tab identifying the resultant performance of the module. Once the identification color pull tab is attached, the module can then be reinserted into the interface equipment socket. To ensure that no components were damaged and/or that no performance specifications were altered in the process, the module may need to be re-tested. In the event that the performance of the module has changed significantly, the process may need to be repeated to change the entire identification color pull tab. As can be appreciated, this procedure is costly, time consuming, and prone to error.

There is a need for a flexible pull tab with an identification region configured to receive an exchangeable identification marker that can be removed and replaced while the pull tab remains attached to a communications module. Moreover, it would be advantageous if the identification marker were clearly visible to end users of the equipment to quickly and efficiently identify any given module employing the identification marker. These and other needs are addressed by the various aspects, embodiments, and/or configurations of the present disclosure. Also, while the disclosure is presented in terms of exemplary embodiments, it should be appreciated that individual aspects of the disclosure can be separately claimed.

The present disclosure can provide a number of advantages depending on the particular aspect, embodiment, and/or configuration. Among other things, embodiments of the present disclosure provide a pull tab with at least one exchangeable identification marker. More specifically, at least one identification marker can be removably attached to the pull tab to provide an identification of an associated module in which the pull tab is inserted or was previously inserted. As provided herein, the exchangeable identification marker may be inserted and/or removed from a module while the module remains in an inserted, or connected, position with additional communications equipment. In some cases the identification marker may employ a security feature to prevent unauthorized removal of the identification marker from the pull tab. In any event, the identification may be in the form of a color, shape, mark, or combinations thereof, associated with the identification marker.

These and other advantages will be apparent from the disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

It shall be understood that the term "means," as used herein, shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

Embodiments of the present disclosure are generally directed to pull tabs for pluggable modules having one or more identification markers. The pull tabs may also be referred to herein as flexible pull tabs, meaning that the pull tabs may be at least partially constructed from a flexible material. It should be appreciated, however, that such a construction is not required even when the pull tab is referred to as a flexible pull tab. In some embodiments, the flexible material may allow the pull tab to be manipulated about a pluggable module. For example, the flexible pull tab may be operatively attached to the pluggable module at a proximal location of the pull tab. As can be appreciated, the flexibility of the pull tab may allow a point of the pull tab distal to the proximal location of the pull tab to be deflected when subjected to a force. Continuing the example above, a user may wish to deflect the pull tab attached to a communications module to insert and/or remove communications equipment, peripherals, fiber optics, cables, combinations thereof, and the like.

The identification markers, as presented herein, may employ one or more identifiers to differentiate at least one feature of a pluggable module from another. Additionally or alternatively, it is anticipated that the identification markers may employ one or more identifiers to differentiate one identification marker from another identification marker. As can be appreciated, the identification markers disclosed herein may be used to differentiate one pluggable module from another pluggable module. In some cases, the identification markers may be colored, sized, shaped, and/or otherwise marked to serve as a differentiating identifier. As provided herein, the identification markers may be attached to, and in some cases removed from, a pull tab. These and other embodiments will be described in more detail as follows.

Referring initially to FIG. 1, an illustrative communications platform 100 is shown including two inserted pluggable modules 120 with pull tabs 216 having identification markers. In some embodiments, the communications platform 100 may be associated with a communications network device. For example, the communications platform 100 may be a part of a network switch, router, communications management system, data conversion system, and/or the like. In one embodiment, the communications platform 100 may include a motherboard 104, a memory 108, and a microcontroller 112. The motherboard 104 may be generally configured with electrical interconnections between one or more subcomponents and may even interface (e.g., via a backplane, electrical connection, electromechanical connection, etc.) with other communications equipment and/or platforms. Additionally, the motherboard 104 may include an expansion capability to attach various components and functionality.

The communications platform 100 may be configured to receive one or more pluggable modules 120 via an electrical interconnection and/or one or more sockets 116. In some cases, the sockets 116 may employ electromagnetic interference (EMI) shielding features. Examples of pluggable modules 120 may include, but are not limited to, communication modules, data modules, transceivers, hot-pluggable transceivers, small form factor (SFF) transceivers, quad small form-factor pluggable (QSFP) transceivers, high-bandwidth QSFP transceivers (QSFP+), and the like. The pluggable modules 120 may be removably connected to the one or more sockets 116, the motherboard 104, and/or communications equipment via a latching mechanism. For example, the latching mechanism may be a part of the pluggable module 120, the one or more sockets 116, or both. The latching mechanism may be actuated to ensure a positive engagement of the pluggable module 120 with other equipment via interlocking components. Moreover, this latching mechanism may be actuated to disengage the pluggable module 120 from the one or more sockets 116. In some embodiments, the latching mechanism may be operatively connected to a pull tab of a pluggable module 120. In one example, an actuation of the latching mechanism may be achieved via a transfer of force from the pull tab of the pluggable module 120 to at least one of the interlocking components. For instance, a user may pull on the pull tab to release a latch caused by the latching mechanism to remove the pluggable module 120 from the communications platform 100.

Additionally or alternatively, a pluggable module 120 may be engaged with (e.g., inserted into) one or more sockets 116 via an electromechanical connection providing a connection and/or retaining force between the pluggable module 120 and an electrical connection. Among other things, the pluggable module 120 and the one or more sockets 116 may not require a latching mechanism that needs to be actuated for insertion and/or extraction. In one example, a pluggable module 120 may be inserted into a socket 116 where an electrical connection, via electromechanical features, is configured to both retain the pluggable module as well as electrically couple the pluggable module 120 with one or more components of the communications platform 100. Insertion may be achieved by applying a force to a pull tab associated with the pluggable module 120 or by applying a force directly to the pluggable module 120 itself. In some embodiments, extraction of the pluggable module 120 from the socket 116 may be achieved by applying an extraction force to a pull tab associated with the pluggable module 120. In other words, a user may pull on the pull tab of the pluggable module 120 to remove it from the socket 116.

Figure 2:
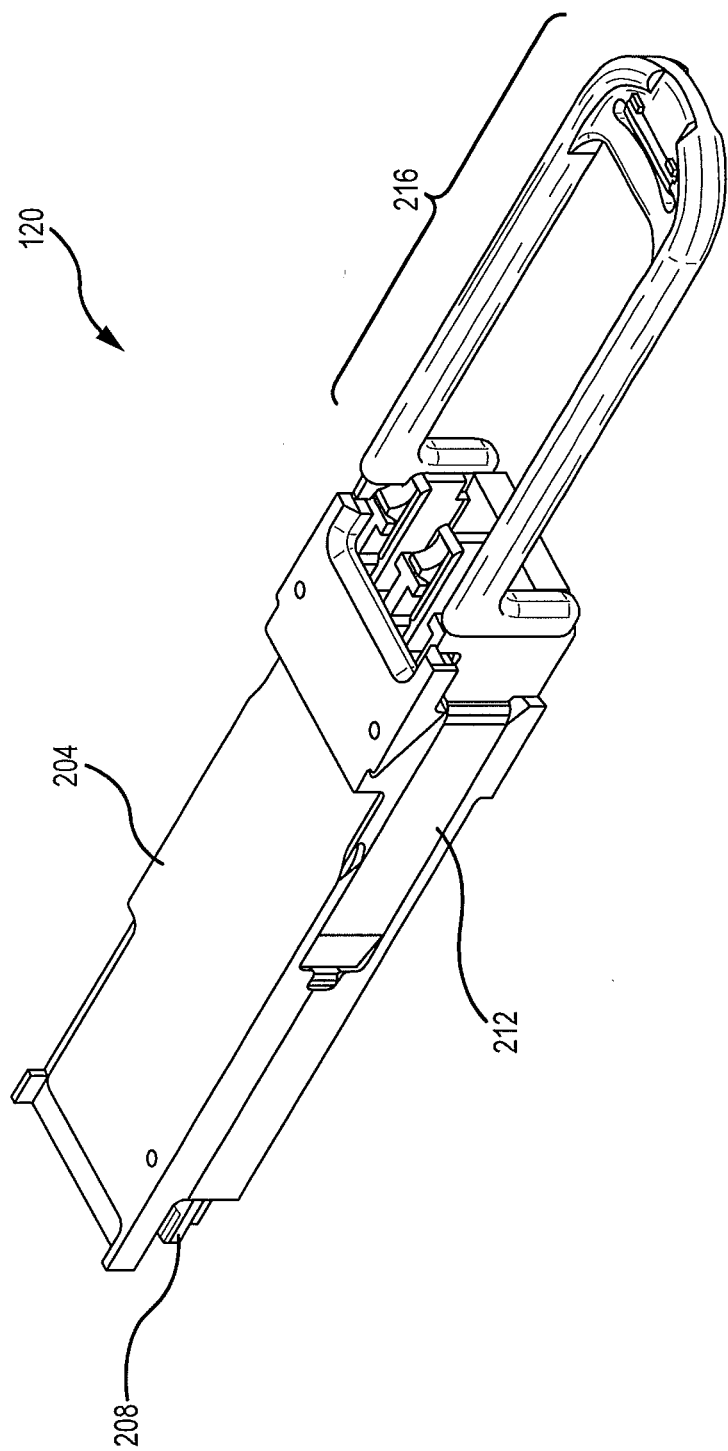
FIG. 2 is a perspective view of a pluggable module in accordance with embodiments of the present disclosure.

FIG. 2 shows a perspective view of a pluggable module 120 having a pull tab 216 with identification marker in accordance with embodiments of the present disclosure. In some embodiments, the pluggable module 120 may include a module housing 204, at least one electrical connection 208, at least one pull tab connection bracket 212, and a pull tab 216 with identification marker. The module housing 204 may be configured to house the one or more subcomponents composing the pluggable module 120. In some cases, the module housing 204 may include a mechanical interconnection for the at least one pull tab connection bracket 212. This mechanical interconnection may be static or dynamic.

In some embodiments, a static mechanical interconnection of the module housing 204 may be one or more features configured to receive the pull tab connection bracket 212. For example, the one or more features may be configured as a recess in the module housing 204, and the pull tab connection bracket 212, or latching component, may employ a tab, hook, protrusion, or the like to engage with recess. This combination of features can allow pull forces applied at a connected pull tab 216 with identification marker to be transferred to the module housing 204.

In other embodiments, a dynamic mechanical interconnection of the module housing 204 may be one or more features configured to receive and transmit forces to a latching mechanism. As previously provided, the latching mechanism may be a part of the module housing 204 and/or the socket 116. In any event, it is anticipated that the dynamic mechanical interconnection may be configured to allow pull forces applied at a connected pull tab 216 with identification marker to be transferred to a latching mechanism. This transfer of pull forces may provide the necessary force to release the latching mechanism and allow the pluggable module 120 to be removed from a socket 116.

The pluggable module 120 illustratively comprises at least one electrical connection 208. In some embodiments, the electrical connection 208 may be electrically connected to one or more subcomponents composing the pluggable module 120. Additionally or alternatively, the electrical connection 208 may be attached to the module housing 204. In some embodiments, the electrical connection 208 may act as a mechanical connection as stated above. For instance, the electrical connection 208 may employ mechanical features to engage the pluggable module 120 with a socket 116, a motherboard 104, communications equipment, and the like. By way of example, the electrical connection 208 may include plug features (e.g., pins, blades, protrusions, plug housing, etc.). Continuing the example, the socket 116 or motherboard 104 may employ mating receptacle features (e.g., holes, spring contacts, cuts, etc.). Similar to a standard plug and receptacle, these electromechanical features may provide the force required to retain the connection. In another embodiment, the socket 116 or motherboard 104 may employ the plug features, while the electrical connection 208 may include the mating receptacle features. In yet another embodiment, the electrical connection 208 may employ both plug and receptacle features. In this case it is anticipated that the socket 116 or motherboard 104 may employ the corresponding mating features.

In some embodiments, the pull tab 216 may be mechanically attached to the module housing 204, the at least one pull tab connection bracket 212, or both. The flexible pull tab 216 may be attached at one or more points of the pluggable module 120. In one example, the pull tab 216 may be molded over at least a portion of the pull tab connection bracket 212. For instance, the pull tab connection bracket 212 may be manufactured from sheet metal, and then inserted into a mold of the pull tab 216. Once inserted, at least a portion of the pull tab 216 may be molded over at least a portion of the pull tab connection bracket 212. Continuing this example, the pull tab 216 and/or the pull tab connection bracket 212 may be positioned to ensure a specific flexibility of the pull tab 216. As can be appreciated, if the pull tab 216 is molded over a substantial length of the pull tab connection bracket 212 the flexibility of the pull tab 216 would be reduced. In one embodiment, it is anticipated that a specific length of the pull tab connection bracket 212 be inserted into the pull tab 216, where the specific length inserted is equivalent to 5% to 50% of a total length of the pull tab 216.

Additionally or alternatively, the pull tab 216 may be attached to the module housing 204, the at least one pull tab connection bracket 212, or both, via one or more other mechanical attachments. Examples of these other mechanical attachments may include, but is in no way limited to, welding, brazing, fastening (e.g., riveting, threaded fastening), adhering (e.g., UV curing, epoxy setting, gluing, etc.), melting, interconnecting (e.g., hook and loop, tab and groove, threaded connection, interference fits, etc.), and other attachments known in the art.

Figure 3A:
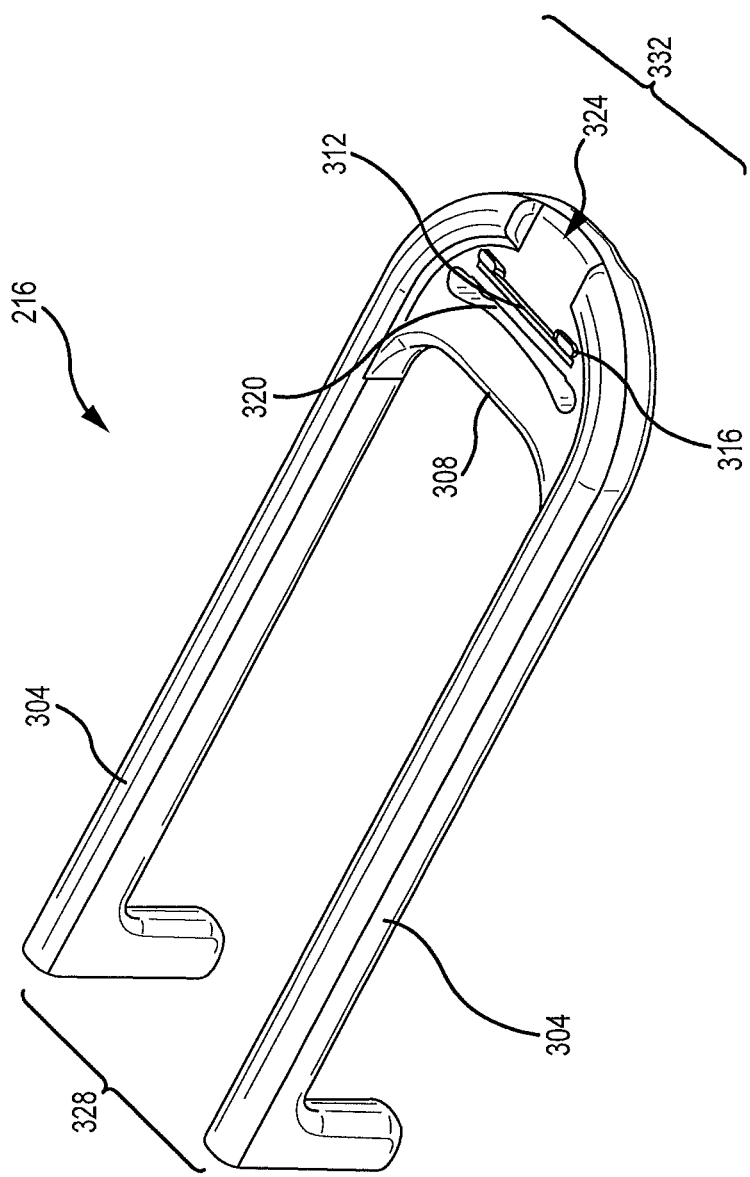
FIG. 3A is a full perspective view of a first pull tab in accordance with embodiments of the present disclosure.

FIG. 3A shows a perspective view of a pull tab 216 with features to receive an identification marker in accordance with embodiments of the present disclosure. As shown, the pull tab 216 includes a pair of arms 304 joined by a web section 308. The web section 308 includes a first recess 312, a first retaining feature 316, a marker clearance 320, a viewing relief area 324, as well as a proximal end 328, and a distal end 332. In some embodiments, the pull tab 216 may be configured to attach to a pluggable module 120 at the proximal end 328 of the pull tab 216. The pull tab 216 may include a number of features to provide adequate grip, comfort, and flexibility, to name a few.

The pull tab 216, or at least some of its constituent parts, may be manufactured from at least one flexible material. Examples of flexible material include, but are not limited to, plastic, rubber, silicone, nickel-titanium (Nitinol), combinations thereof, and the like. Some plastics, such as thermoplastic elastomers (TPE), thermoplastic vulcanizate elastomers (TPV), and the like, offer good flexibility while also offering good dimensional stability over temperature and time, fatigue resistance, as well as the ability to be overmolded on, or molded onto, other materials.

In some embodiments, flexibility of the pull tab 216 may be provided in part by the geometry and/or cross-section of the pair of arms 304. It is an aspect of the present disclosure to provide a cross-section that can withstand tensile extraction forces (e.g., from a user pulling on the pull tab 216), while remaining flexible along a bending plane. As shown in FIG. 3A, fillet radii applied along edges, joints, and other stress concentration areas, may increase the fatigue resistance of the pull tab 216 while adding to the comfort associated with holding and pulling the pull tab 216. For example, the web section 308 may act as a finger pull (e.g., a section upon which a user may hold/pull to apply force). This web section 308 may be joined to the pair of arms 304 with fillet radii suitable to distribute stresses along the pull tab 216 when subjected to extraction forces. Additionally or alternatively, the fillet radii may closely conform to the shape of an average finger to provide comfort when extraction forces are applied to the pull tab 216.

In some embodiments, the pull tab 216 may include a viewing relief area 324. Among other things, the viewing relief area 324 provides a relieved portion of material adjacent to the web section 308. In one embodiment, the relieved portion of material may include an absence of material in a given area of the web section 308. This viewing relief area 324 can provide an uninterrupted line of sight to an attached identification marker, from a position distal to the distal end 332 of the pull tab 216, especially when viewed along a plane that is coplanar with a surface of the web section 308. An exemplary view taken from this position is shown in FIG. 3C.

It should be appreciated that the pull tab 216 disclosed in this specification includes one or more features common to all embodiments of the pull tab 216 as disclosed herein, unless explicitly stated otherwise. It should be noted, however, that the exclusion of a specific indicator, numeral reference, or other feature identifier from either the written description, or the figures, is not intended as an explicit exclusion from the anticipated embodiments of the present disclosure. As such, the various embodiments provided herein may be practiced together and/or separately with natural variations in scope and use.

FIGS. 3A-5D show embodiments of identification markers 340, 440, 540 and pull tabs 216 in accordance with embodiments of the present disclosure. In some embodiments, the web section 308 of the pull tab 216 includes one or more features configured to receive, locate, and/or retain an identification marker 340, 440, 540. The identification marker 340, 440, 540 may be configured to at least partially insert, snap, wedge, lock, lodge, or combinations thereof, into the pull tab 216 adjacent to the web section 308. Additionally or alternatively, the identification marker 340, 440, 540 may key or otherwise attach to the pull tab 216 adjacent to the web section 308.

In some embodiments, the identification marker 340, 440, 540 may be manufactured from flexible and/or rigid material. Examples of some identification marker 340, 440, 540 materials can include, but are not limited to, plastic, rubber, silicone, resin, cellulose, phenols, fiber composite, carbon fiber, metal, glass, combinations thereof, and the like. As can be appreciated, certain plastics such as polycarbonate (PC) and acrylonitrile butadiene styrene (ABS) exhibit good strength, hardness, as well as finish (e.g., gloss, textured, matt, etc.), and can be provided in any number of colors. In some embodiments, the identification marker 340, 440, 540 may be manufactured from aluminum. Not only can aluminum be cast, extruded, molded, machined, forged, bent, and arranged into a number of shapes, but aluminum can be anodized in a variety of colors. Additionally or alternatively, aluminum can accept a number of coatings, finishes, and marks. Moreover, aluminum offers high recyclability for an environmentally friendly choice of material.

It is an aspect of the present disclosure that the identification marker 340, 440, 540 may at least employ the use of color as an identifying indicia. Among other things, a specific color of an identification marker 340, 440, 540 may be used to identify a property or feature of an associated pluggable module 120. Pluggable modules 120 are often rated by their performance specifications. By way of example, a pluggable module 120 may be an optical transceiver that supports 40-Gigabit signals over specific link distances. In this example, the pluggable module 120 may be identified using a "blue" colored identification marker 340, 440, 540. Other colors of the identification marker 340, 440, 540 may include, but are not limited to, "beige," "yellow," "orange," "red," "grey," and other combinations of primary colors. Additionally or alternatively, the identification marker 340, 440, 540 may employ the use of "white," "black," as well as shades and/or tints thereof and of any other color.

In some embodiments, the identification marker 340, 440, 540 may be selectively engaged with the pull tab 216 without requiring the pull tab 216 to be removed from a pluggable module 120 that may be installed in a socket 116, or attached to a motherboard 104. In other words, it is an aspect of the present disclosure to allow the identification marker 340, 440, 540 to be installed, or engaged, with a pull tab 216 while the pull tab 216 is attached to a pluggable module 120 that is installed in a socket 116, motherboard 104, or communications platform 100. Additionally or alternatively, identification marker 340, 440, 540 may be removed, or disengaged, from a pull tab 216 while the pull tab 216 is attached to a pluggable module 120 that is installed in a socket 116, motherboard 104, or communications platform 100. For example, an installed pluggable module 120 may require an identification marker 340, 440, 540 to identify at least one characteristic of the pluggable module 120. In this example, a user may replace, remove, or install an identification marker 340, 440, 540 without removing the pluggable module 120 from its installed position.

In some cases, the identification marker 340, 440, 540 may include features to assist in maintaining an alignment, position, or orientation when engaged with a pull tab 216. These features may include, but are in no way limited to, "C-shaped" cross-section, two-piece construction, snap-fit tabs, interference fits, flanges, spring material, combinations thereof, etc.

Figure 3D:
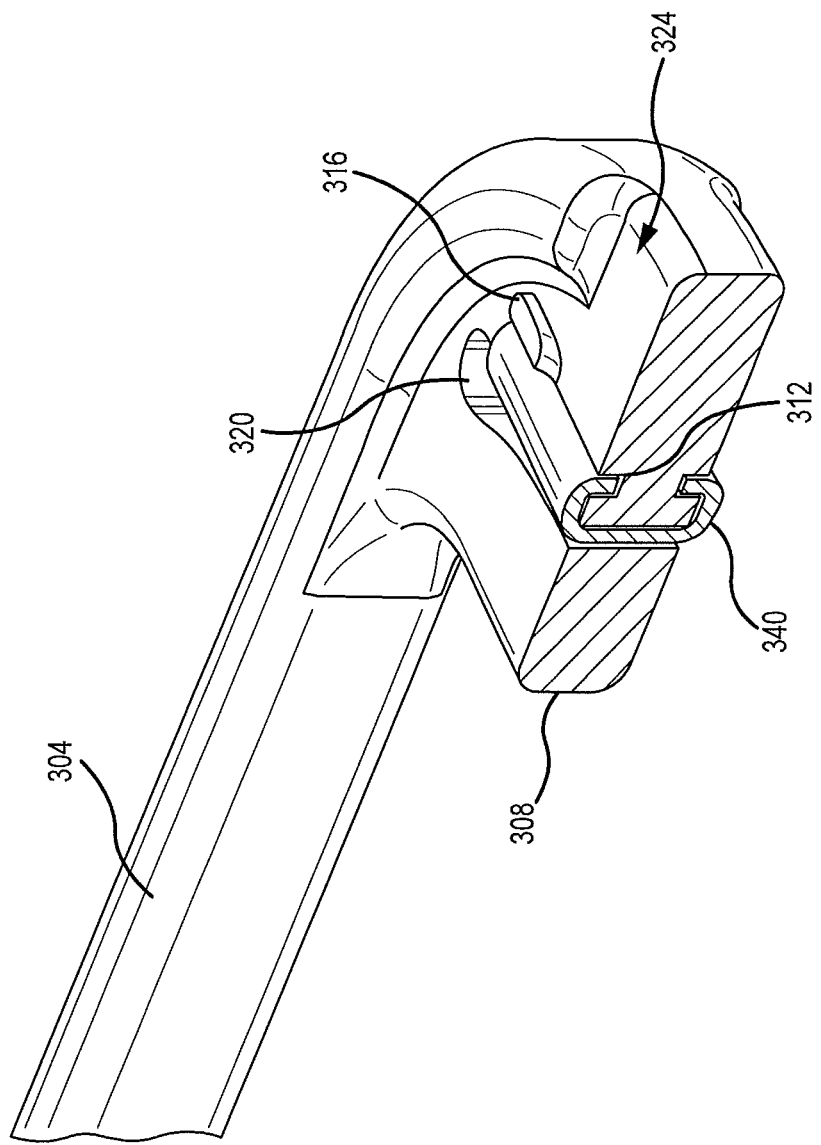
FIG. 3D is a partial perspective section view of the first pull tab taken from section "X-X" of FIG. 3C.

Referring now to FIGS. 3A-3D, the web section 308 of the first embodiment of the pull tab 216 is shown including a first recess 312, a first retaining feature 316, and a marker clearance 320. The first recess 312 may be configured to receive a first portion of an identification marker 340. As shown in FIG. 3D, the identification marker 340 may include a substantially "C-shaped" cross-section. In some cases, the cross-section of the identification marker 340 may at least partially provide clamping, clipping, and/or spring force. In this example, the identification marker 340 comprising a "C-shaped" cross-section may act as a spring clip. At least a portion (e.g., an open end of the "C-shaped" cross-section) of the identification marker 340 may engage with the first recess 312 of the web section 308. This engagement may positively locate the identification marker 340. Additionally or alternatively, the engagement with the first recess 312 may direct any spring force of the identification marker 340 against a portion of the first recess 312 and/or the web section 308 providing the force to attach the identification marker 340 to the pull tab 216. In some cases, the first recess 312 may have a specific depth in the web section 308. In other embodiments, the first recess 312 may pass completely through a portion of web section 308, forming a clearance of material from one side of the web section 308 to the another side of the web section 308.

In some embodiments, the identification marker 340 may attach to the pull tab 216 about at least a portion of the web section 308. For instance, FIG. 3D shows a detailed perspective section view of a pull tab 216 in accordance with embodiments of the present disclosure. As shown, the identification marker 340 is engaged with the pull tab 216 and at least partially around the web section 308. In particular, the identification marker 340 may be inserted through a marker clearance 320 in the web section 308. The marker clearance 320 may provide an area, into which, the identification marker 340 may be inserted. This marker clearance 320 may also provide an area by which the identification marker 340 may be subsequently removed from the pull tab 216. Once the identification marker passes through the marker clearance 320, at least a portion of the identification marker 340 can engage with the first recess 312. In some cases, a first portion (e.g., an open end of the "C-shaped" cross-section) of the identification marker 340 may engage with the first recess 312 on a first side (e.g., an upper side) of the web section 308 and a second portion (e.g., another open end of the "C-shaped" cross-section) of the identification marker 340 may engage with the first recess 312 on a second side (e.g., a lower side, opposite the upper side) of the web section 308. In another embodiment, a first portion of the identification marker 340 may engage with the first recess 312 on the first side (e.g., the upper side) of the web section 308 and a second portion of the identification marker 340 may engage with a second recess disposed on a second side (e.g., a lower side, opposite the upper side) of the web section 308. In this embodiment, the first recess 312 and the second recess may be configured to have similar or different indented depths into the web section 308.

The web section 308 may employ various features to retain and/or capture an engaged identification marker 340. In some embodiments, the marker clearance 320 may prevent the identification marker 340 from being easily removed from the pull tab 216. Such a feature may require the identification marker 340 to be specially manipulated before it can be removed. In other words, standard operation of the pull tab 216 (e.g., pulling on the web section 308, removing the pluggable module 120 from a socket 116 or equivalent, flexing the pull tab 216 to insert and/or remove cables (e.g., fiber optic, copper, etc.) would not usually cause the identification marker 340 to disengage from its engaged position. Additionally or alternatively, a first retaining feature 316 may be disposed on or adjacent to the web section 308 to prevent at least one movement of the identification marker 340 while it is engaged with the pull tab 216. For example, the first retaining feature 316 may act to prevent rotation of the identification marker 340 when engaged with the pull tab 216. In this example, the first retaining feature 316 is configured as a protrusion disposed adjacent to the open end of the "C-shaped" cross-section of the identification marker 340. As can be appreciated, the pull tab 216 may include one or more retaining features, including but not limited to, first retaining features 316. As shown, the closed section of the elongated "C-shaped" cross-section of the identification marker 340 is disposed proximal to the first recess 312.

FIG. 3C shows an end view of pull tab 216 with an engaged identification marker 340 in accordance with embodiments of the present disclosure. In some embodiments, the pull tab 216 may include a viewing relief area 324. This viewing relief area 324 may be at least partially disposed along a section of the web section 308, the pair of arms 304, or combinations thereof. Among other things, the viewing relief area 324 may assist a user in viewing the identification marker 340 from a position facing the distal end of the pull tab 216. The viewing relief area 324 may be especially helpful to a user attempting to view the identification marker 340 from a plane that is coplanar with an upper or lower surface of the web section 308. As can be appreciated, some embodiments of the pull tab 216 may employ one or more viewing relief areas 324 to provide at least a partially unobstructed view of the identification marker 340.

Figure 4:
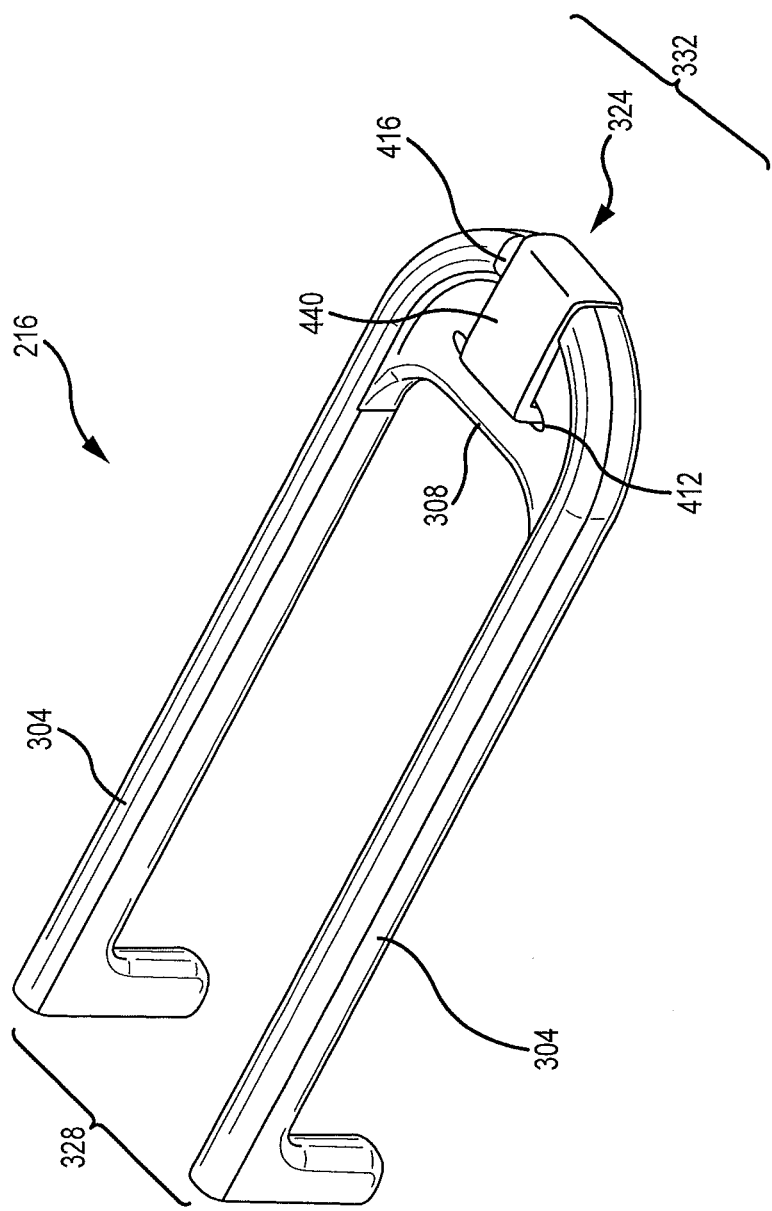
FIG. 4 is a full perspective view of a second pull tab with an engaged identification marker in accordance with embodiments of the present disclosure.

Referring now to FIG. 4, a perspective view of a second embodiment of a pull tab 216 with an engaged identification marker 440 is shown in accordance with embodiments of the present disclosure. In some embodiments, the pull tab 216 is substantially similar to the pull tab 216 as disclosed above. The pull tab 216 includes a first recess 412, a first retaining feature 416, and an identification marker 440. As provided in FIG. 4, the identification marker 440 is configured as an elongated spring clip. The identification marker 440 employs a similar "C-shaped" cross-section to that of the identification marker 340 disclosed above. It is an aspect of the present embodiment, that the identification marker 440 comprises an elongated upper surface. In some cases, the identification marker 440 may comprise an elongated lower surface. The identification marker 440 is configured to wrap around a portion of the web section 308 and a distal portion 332 of the pull tab 216.

In some cases, a first portion (e.g., an open end of the elongated "C-shaped" cross-section) of the identification marker 440 may engage with the first recess 412 on a first side (e.g., an upper side) of the web section 308 and a second portion (e.g., another open end of the elongated "C-shaped" cross-section) of the identification marker 440 may engage with the first recess 412 on a second side (e.g., a lower side, opposite the upper side) of the web section 308. In another embodiment, a first portion of the identification marker 440 may engage with the first recess 412 on the first side (e.g., the upper side) of the web section 308 and a second portion of the identification marker 440 may engage with a second recess disposed on a second side (e.g., a lower side, opposite the upper side) of the web section 308. In this embodiment, the first recess 412 and the second recess may be configured to have similar or different indented depths into the web section 308. As shown, the closed section of the elongated "C-shaped" cross-section of the identification marker 440 is disposed distal to the first recess 412.

The web section 308 may employ various features to retain and/or capture an engaged identification marker 440. In some embodiments, the first recess 412 may prevent the identification marker 440 from being easily removed from the pull tab 216. Such a feature may require the identification marker 440 to be specially manipulated before it can be removed. In other words, standard operation of the pull tab 216 (e.g., pulling on the web section 308, removing the pluggable module 120 from a socket 116 or equivalent, flexing the pull tab 216 to insert and/or remove cables (e.g., fiber optic, copper, etc.) would not usually cause the identification marker 440 to disengage from its engaged position. Additionally or alternatively, a first retaining feature 416 may be disposed on or adjacent to the web section 308 to prevent at least one movement of the identification marker 440 while it is engaged with the pull tab 216. For example, the first retaining feature 416 may act to key the identification marker 440 in a lateral position across a width of the pull tab 216 or the web section 308 when the identification marker 440 is engaged with the pull tab 216. In this example, the first retaining feature 416 is configured as a relieved section of material disposed adjacent to the distal end 332 of the pull tab 216. As can be appreciated, the pull tab 216 may include one or more retaining features, including but not limited to, first retaining features 416 disposed on a first and/or second side of the pull tab 216.

Additionally or alternatively, the pull tab 216 may include a relieved viewing area 324. This viewing relief area 324 may be at least partially disposed along a distal end portion of the web section 308, the pair of arms 304, or combinations thereof. Among other things, the viewing relief area 324 may assist a user in viewing the identification marker 440 from a position facing the distal end of the pull tab 216. The viewing relief area 324 may be especially helpful to a user attempting to view the identification marker 340 from a plane that is coplanar with an upper or lower surface of the web section 308. As can be appreciated, some embodiments of the pull tab 216 may employ one or more viewing relief areas 324 to provide at least a partially unobstructed view of the identification marker 440. FIG. 4 shows that the viewing relief area 324 is configured as a keyway in the distal end of the pull tab 216 to receive the identification marker 440. In some cases the identification marker 440 may be disposed within the keyway to provide a flush distal surface of the pull tab 216.

Figure 5A:
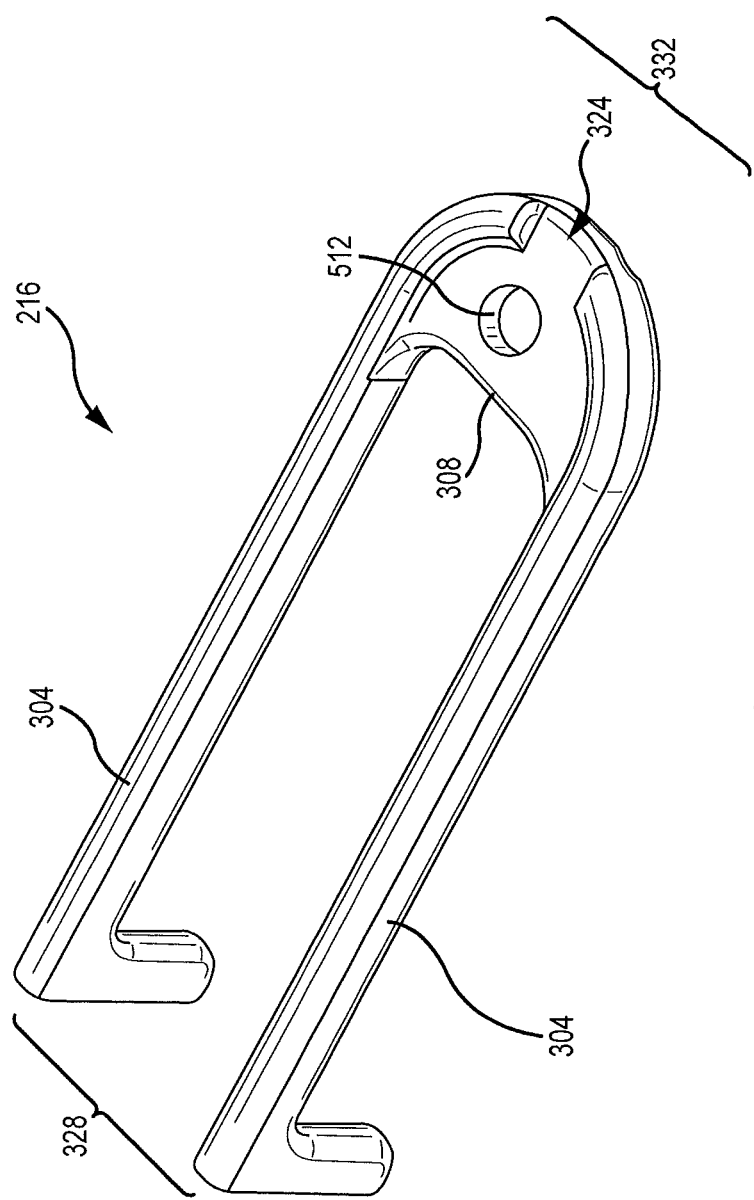
FIG. 5A is a full perspective view of a third pull tab in accordance with embodiments of the present disclosure.

FIGS. 5A-5D, show various perspective views of a third embodiment of the pull tab 216 in accordance with embodiments of the present disclosure. The web section 308 of the third embodiment of the pull tab 216 is shown including a first recess 512 and a first retaining feature 516. The first recess 512 may be configured to receive a first portion of an identification marker 540. As shown in FIG. 5D, the identification marker 540 may include a "snap rivet" shape. Specifically, the identification marker 540 may include an upper flanged portion 544, or flanged head, and a lower retaining portion 548. In some embodiments, as the identification marker 540 is inserted into the first recess 512, the lower retaining portion 548 may compress until it passes through the first recess into the first retaining feature 516 of the web section 308. In other embodiments, the identification marker 540 may be configured as two or more pieces. In a two-piece embodiment, a first piece may be configured as the upper flanged portion 544, and a second piece may be configured as the lower retaining portion 548. By way of example, the upper flanged portion 544 may be attached from a first side of the web section 308, while the lower retaining feature 548 may be attached from a second side (e.g., opposite to the first side) of the web section 308. In some cases, the upper flanged portion 544 may be attached to the lower retaining feature 548 to form the identification marker 540. As can be appreciated the attachment may be achieved via threaded fastening, rivet features, interference fits, bolting, compression fits, combinations thereof, and the like. In any event, the upper flanged portion 544 and/or the lower retaining feature 548 may act to attach and retain the identification marker 540 in the pull tab 216. In some embodiments, the identification marker 540 may include a coupling 546 that connects the upper flanged portion 544 to the lower retaining feature 548.

It is an aspect of the present disclosure that the identification marker 540 may include a security fastening feature. The security fastening feature may be a part of the upper flanged portion 544 and/or the lower retaining feature 548 of the identification marker 540. In some embodiments, the identification marker 540 may require a security tool to at least one of attach and remove the identification marker. Examples of some security fastening features may include, but are not limited to, tool receiving features such as star-shaped (e.g., Torx® brand screw head with or without security pin features), hexagonal, pentagonal, security pin, triangular, square, lobed, snake-eye, other receptacles, and combinations thereof.

In some embodiments, the upper flanged portion 544 of the identification marker 540 may be configured as an axially symmetrical shape (e.g., round, cylindrical, spherical, semi-spherical, etc.). In some cases, this axially symmetrical shape may allow the identification marker 540 to rotate freely while engaged with the web section 308 of the pull tab 216. In one embodiment, the web section 308 may include a first recess 512 that passes from a first side of the web section 308 to second side (e.g., opposite to the first side) without a retaining feature 516. In other words, the identification marker 540 may be retained in an engaged position by the lower retaining feature 548 of the marker 540 being disposed below the second side of first recess 512. In this embodiment, the counter-bored feature of the first retaining feature 516 is not required.

FIG. 5D shows an end view of pull tab 216 with an engaged identification marker 540 in accordance with embodiments of the present disclosure. In some embodiments, the pull tab 216 may include a viewing relief area 324. This viewing relief area 324 may be at least partially disposed along a section of the web section 308, the pair of arms 304, or combinations thereof. Among other things, the viewing relief area 324 may assist a user in viewing the identification marker 540 from a position facing the distal end of the pull tab 216. The viewing relief area 324 may be especially helpful to a user attempting to view the identification marker 540 from a plane that is coplanar with an upper or lower surface of the web section 308. As can be appreciated, some embodiments of the pull tab 216 may employ one or more viewing relief areas 324 to provide at least a partially unobstructed view of the identification marker 540. In some embodiments, a viewing relief area 324 may not be required, especially when the identification marker 540 is visible from a position coplanar with a surface of the web section 308 and distal to the distal end 332 of the pull tab 216.

The exemplary systems and methods of this disclosure have been described in relation to pluggable communications modules (e.g., optical transceiver modules, etc.) and associated devices, but should not be so limited. Moreover, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

A number of variations and modifications of the disclosure can be used. It would be possible to provide for some features of the disclosure without providing others.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/ or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A pull tab for a pluggable module, comprising:
a pair of elongate arms having proximal and distal ends, the elongate arms adapted to operatively attach to the pluggable module via the proximal ends; and
a web section coupling the pair of elongate arms via the distal ends, the web section comprising:
 a first recess disposed in the web section at least on a first side of the web section and configured to receive at least a portion of an exchangeable identification marker; and
 a first retaining feature configured to maintain a position of the exchangeable identification marker relative to the web section when the at least a portion of the exchangeable identification marker engages the first recess, and wherein the exchangeable identification marker is configured to at least engage with and disengage from the pull tab while the pluggable module is installed in a socket.

2. The pull tab of claim 1, wherein the web section further comprises:
a marker clearance area disposed adjacent to the first recess and through the web section from the first side to a second side of the web section, wherein the marker clearance area is sized to receive a portion of an exchangeable identification marker body.

3. The pull tab of claim 1, wherein the web section further comprises:
a second retaining feature configured to maintain a position of the exchangeable identification marker relative to the web section when the at least a portion of the exchangeable identification marker engages the first recess.

4. The pull tab of claim 1, wherein the first retaining feature is configured to prevent rotation of the exchangeable identification marker when the exchangeable identification marker is engaged with the first recess of the web section.

5. The pull tab of claim 1, wherein the first recess passes through the first side of the web section to a second side of the web section.

6. The pull tab of claim 1, wherein the first recess is configured as a receptacle having a bottom depth within the web section.

7. The pull tab of claim 6, wherein the web section further comprises:
a second recess configured as a receptacle disposed on a second side of the web section and having a bottom depth within the web section, and wherein the first and second recesses are configured to receive the exchangeable identification marker when engaged with the pull tab.

8. The pull tab of claim 1, wherein the web section includes a viewing relief area, and wherein the viewing relief area is configured as a relieved portion of material adjacent to the web section, such that the exchangeable identification marker, when engaged with the pull tab, is visible at least from a distal end of the pull tab.

9. The pull tab of claim 8, wherein the viewing relief area is configured to provide a partially unobstructed view of the engaged exchangeable identification marker from a viewing position along a plane that is coplanar with the first side of the web section and distal to both the distal ends and the web section.

10. The pull tab of claim 1, wherein the exchangeable identifier marker comprises a body having at least one identification surface.

11. The pull tab of claim 10, wherein the exchangeable identification marker comprises at least one engagement feature that engages with and disengages from the first recess.

12. The pull tab of claim 11, wherein the body is arranged as a spring clip and wherein the spring clip is configured to clip onto the web section via a spring force created at least partially by a cross-section of the spring clip.

13. The pull tab of claim 12, wherein the cross-section of the spring clip is substantially "C-shaped".

14. The pull tab of claim 13, wherein the at least one engagement feature is disposed on at least one open portion of the substantially "C-shaped" cross-section.

15. The pull tab of claim 10, wherein the body is configured as a snap rivet.

16. The pull tab of claim 15, wherein the snap rivet comprises a flanged head including an identification surface.

17. The pull tab of claim 16, wherein the snap rivet further comprises a retaining feature disposed adjacent to the flanged head and a coupling.

18. The pull tab of claim 17, wherein the flanged head of the snap rivet is configured as a cylindrical axially symmetrical shape.

19. The pull tab of claim 15, wherein the snap rivet comprises a two-piece construction.

\* \* \* \* \*